(12) United States Patent
Satoh et al.

(10) Patent No.: US 6,326,993 B1
(45) Date of Patent: Dec. 4, 2001

(54) PULSE WIDTH MODULATION SYSTEM AND IMAGE FORMING APPARATUS HAVING THE PULSE WIDTH MODULATION SYSTEM

(75) Inventors: Hiroki Satoh; Makoto Nakajima, both of Tokyo; Koji Tanimoto, Kawasaki, all of (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/526,289

(22) Filed: Mar. 15, 2000

(51) Int. Cl.[7] ................................. B41J 2/47; B41J 2/435
(52) U.S. Cl. ............................................. 347/252; 347/249
(58) Field of Search ..................................... 347/252, 135, 347/249; 395/112

(56) References Cited

U.S. PATENT DOCUMENTS

| | | | |
|---|---|---|---|
| 4,251,821 | * | 2/1981 | Kimura .................................. 347/249 |
| 4,839,665 | * | 6/1989 | Hertz et al. ............................. 347/80 |
| 5,187,495 | | 2/1993 | Tanimoto et al. ..................... 346/108 |
| 5,448,278 | | 9/1995 | Tanimoto et al. ..................... 347/129 |
| 5,793,709 | | 8/1998 | Carley .................................... 368/113 |
| 6,091,891 | * | 7/2000 | Overall et al. ......................... 395/112 |

* cited by examiner

Primary Examiner—Thinh Nguyen
(74) Attorney, Agent, or Firm—Foley & Lardner

(57) ABSTRACT

When a CPU begins to monitor whether delay variation characteristics of a pulse width variation circuit have varied, it selects a basic delay setting value in a basic delay value setting block from a smallest one. The CPU sets a division number in a phase select block from a given minimum desired division number for pulse width modulation. The CPU senses the level of a phase comparison result signal (PHASE) from the pulse width modulation circuit. If the phase comparison result signal is stable at "1", the CPU 1 fixes the division number. If the phase comparison result signal is "0" and the division number is not maximum, the CPU increases the division number and goes back to the setting of the division number. If the division number is maximum, the CPU increases the basic delay and goes back to the basic delay setting.

8 Claims, 16 Drawing Sheets

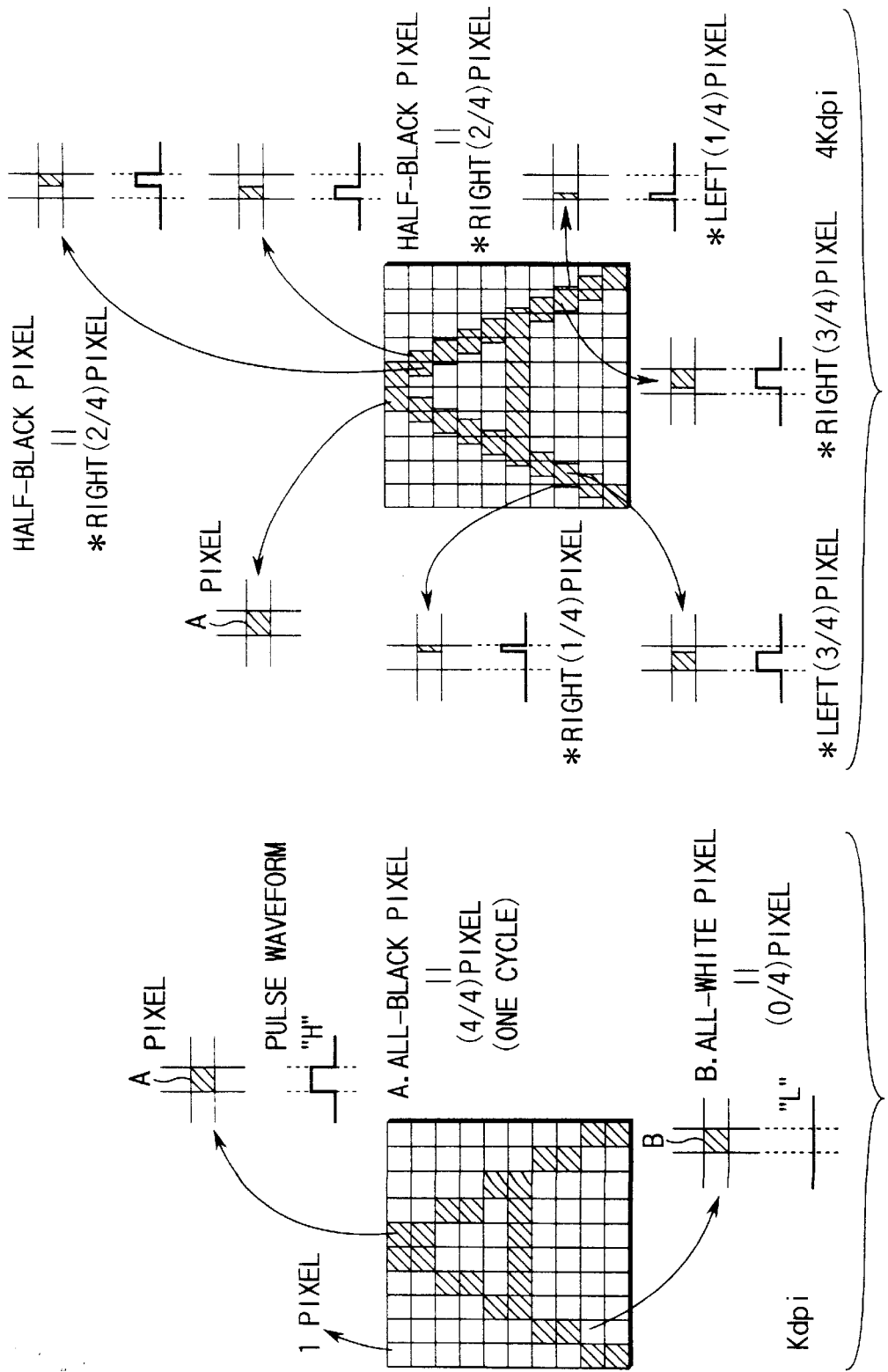

| SYMBOL | SIGNAL NAME | |
|---|---|---|
| signal A: | CLK_START | (CLOCK START SIGNAL) |
| signal B: | CLK_END | (CLOCK END SIGNAL) |
| signal C: | PHASE | (PHASE COMPARISON RESULT SIGNAL) |
| signal D: | DIVISION ⟨n:0⟩ | (DIVISION NUMBER SETTING SIGNAL) |
| signal E: | DATA(ODD SIDE) | (DATA SIGNAL ODD-SIDE) |
| signal F: | DATA(EVEN SIDE) | (DATA SIGNAL EVEN-SIDE) |

FIG. 7B

| SYMBOL | SIGNAL NAME | |
|---|---|---|
| signal G: | PWM_OUT(ODD SIDE) | (PULSE WIDTH MODULATION SIGNAL ODD-SIDE) |
| signal H: | PWM_OUT(EVEN SIDE) | (PULSE WIDTH MODULATION SIGNAL EVEN-SIDE) |
| signal I: | PWM_OUT | (PULSE WIDTH MODULATION SIGNAL) |
| signal J: | SEL | (EVEN/ODD SWITCH SIGNAL) |
| signal K: | DLYSEL ⟨m:0⟩ | (DELAY SETTING SIGNAL) |
| signal L: | CLK | (CLOCK SIGNAL) |
| signal M: | DATA | (DATA SIGNAL) |
| signal N: | POS | (PULSE START POSITION SIGNAL) |
| signal O: | POS(ODD SIDE) | (PULSE START POSITION SIGNAL ODD-SIDE) |
| signal P: | POS(EVEN SIDE) | (PULSE START POSITION SIGNAL EVEN-SIDE) |

FIG. 7C

CONDITION: MIN, 4-DIVISION

CONDITION: MAX, 4-DIVISION

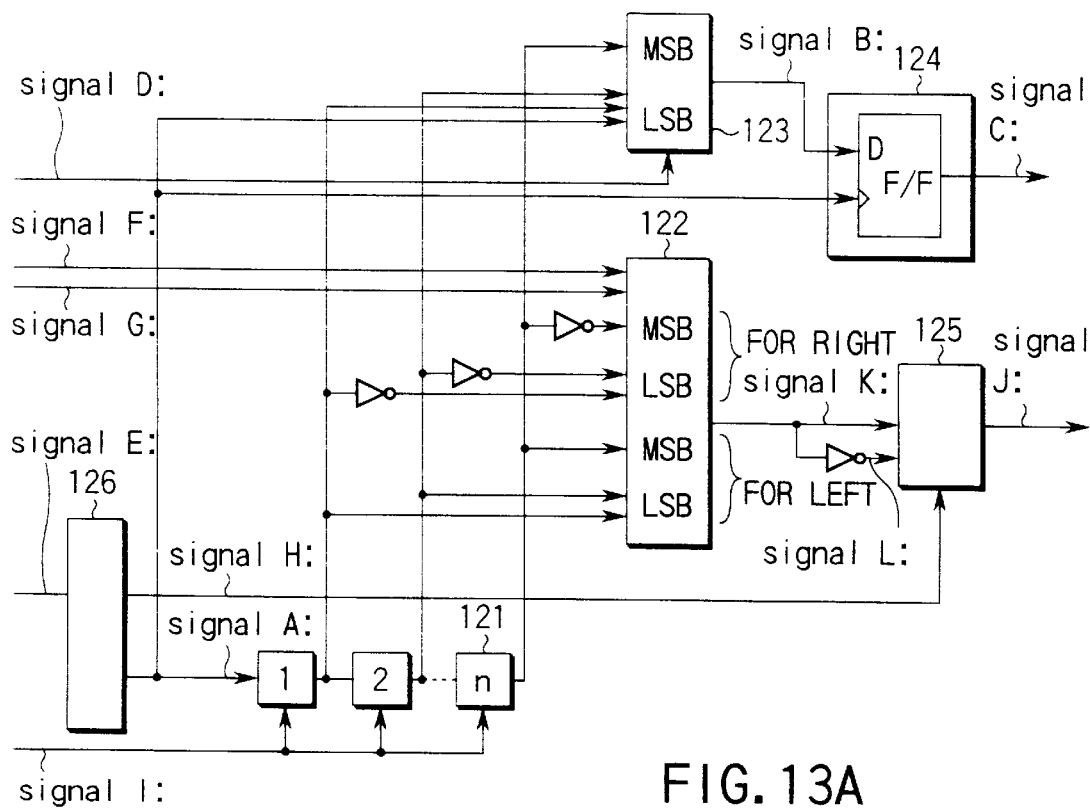

FIG. 13A

| SYMBOL | SIGNAL NAME | |
|---|---|---|
| signal A: | CLK_START | (CLOCK START SIGNAL) |
| signal B: | CLK_END | (CLOCK END SIGNAL) |
| signal C: | PHASE | (PHASE COMPARISON RESULT SIGNAL) |
| signal D: | DIVISION ⟨n:0⟩ | (DIVISION NUMBER SETTING SIGNAL) |
| signal E: | CLK | (CLOCK SIGNAL) |
| signal F: | DATA | (DATA SIGNAL) |
| signal G: | POS | (PULSE START POSITION SIGNAL) |
| signal H: | SEL | (EVEN/ODD SWITCH SIGNAL) |
| signal I: | DLYSEL ⟨m:0⟩ | (DELAY SETTING SIGNALL) |
| signal J: | PWM_OUT | (PULSE WIDTH MODULATION SIGNAL) |
| signal K: | PWM_OUT_POS | (PULSE WIDTH MODULATION SIGNAL) |
| signal L: | PWM_OUT_NEG | (PULSE WIDTH MODULATION SIGNAL) |

FIG. 13B

PULSE WIDTH MODULATION SYSTEM AND IMAGE FORMING APPARATUS HAVING THE PULSE WIDTH MODULATION SYSTEM

BACKGROUND OF THE INVENTION

The present invention relates to a pulse width modulation system for controlling a pulse width modulation of a pulse width modulation circuit, and an image forming apparatus having the pulse width modulation system and forming images.

In the prior art, an image output onto a recording medium (e.g. paper) by a digital copying machine comprises lattice-like divided fine points (dots), as shown in FIG. 1A. Each dot is called a pixel. Normally, one pixel is input in synchronism with one cycle T of an image transfer clock, as shown in FIG. 2A. In this case, one pixel is either all-black (indicated by A in FIG. 1A) or all-white (indicated by B in FIG. 1A). For example, where an image "A" is printed out on a recording medium (e.g. paper), it becomes as shown in FIG. 1A.

It is understood, however, that the image quality of image "A" is enhanced, as shown in FIG. 1B, if the pixel is not limited to all-black or all-white and, for example, the pixel is provided with two information items, i.e. density, such as half-black, and a print start position.

In general terms, a higher image quality is a most desired requirement for digital copying machines. In a laser modulation section of a conventional digital copying machine, a pulse width modulation is carried out in order to meet the above requirement and enhance the image quality. This technique has two functions. One is to control the density of the pixel by providing the all-black or all-white pixel with light emission time information for decreasing or increasing a laser emission time. The other is to control a print start position by providing light emission position information for shifting the laser emission position to the left or to the right. From these functions, pixels having the two information items are generated to enhance the image quality.

The pulse width modulation will now be described in greater detail.

Normally, in the pulse width modulation, in order to control the laser emission time, a one-cycle (two-division cycle) signal of the input signal (image transfer clock) is subjected to a division control and n-division pulse width modulation signals are formed. Thereby, image data with n+1 kinds of densities is generated.

Specifically, this means that n+1 kinds (0/n, 1/n, 2/n, . . . (n−1)/n, n/n) of pixels are generated from one kind (all-black) of pixel. The density of each pixel to be printed is controlled by a pulse width. In this context, the (0/n) pixel is the all-white pixel, and the (n/n) pixel is the all-black pixel.

Moreover, not only the pulse width but also the print start position, i.e. pulse start position, is controlled at the same time in order to control the laser emission position. Thereby, a higher image quality can be obtained.

An example of a technique for obtaining a higher image quality will further be described in detail.

FIGS. 2A and 2B illustrate a 4-division pulse width modulation in association with waveform data and pixels. FIGS. 1A to 1C show an actual example of the 4-division pulse width modulation in which a 4-division pulse width conversion is made from Kdpi to 4 Kdpi in the main scan direction. In this case, K is a given integer. If K=100, for instance, a pulse width conversion is performed from 100 dpi to 400 dpi.

Assume that in FIGS. 1A to 1C an image "A" is printed and output on a recording medium (e.g. paper). If image data is represented by only all-black (A in the Figure) or all-white (B in the Figure) with Kdpi in FIG. 1A, jaggy becomes conspicuous around the character "A" and the image becomes rough.

In FIG. 1B, however, 4-division pulse width modulation signals are formed with 4 Kdpi. Thereby, pixels with five kinds of densities (0/4, 1/4, 2/4, 3/4, 4/4 pixels) are generated. Moreover, by controlling the pulse start position, eight kinds of pixels are generated. Since the 0/4 pixel and 4/4 pixel have no distinction between the right and left, eight kinds of pixels are obtained: 0/4 pixel, left 1/4 pixel, left 2/4 pixel, left 3/4 pixel, right 1/4 pixel, right 2/4 pixel, right 3/4 pixel, and 4/4 pixel. Accordingly, the character "A" is expressed by the combinations of the eight kinds of pixels. As a result, peripheral shaggy becomes less conspicuous and the image quality is enhanced.

As is understood from FIG. 1C, too, the pulse start positions at a left-hand inclined portion of the character "A" are smoothed by right-side pixels, and the pulse start positions at a right-hand inclined portion thereof are smoothed by left-side pixels.

Although FIG. 1C shows the example of 4-division, if an 8-division pulse width modulation is performed, nine kinds of pixels, i.e. 0/8, 1/8, 2/8, 3/8, 4/8, 5/8, 6/8, 7/8 and 8/8, can be generated (16 kinds if the pulse start position control is considered). The greater the division number, the larger the kinds of pixels to be generated. A higher image quality can thus be obtained.

The pulse width modulation has been performed, as described above, in order to enhance the image quality. For this purpose, in the prior art, pulse width modulation circuits using PLLs have been used, and n-division pulse width modulation signals have been generated.

Where a PLL is used, however, if an 8-division pulse width modulation is to be performed in a digital copying machine which operates with an NMHz (N=a given integer) image transfer clock, as shown in FIG. 3, it is necessary to use a 3.5-multiplication PLL. That is, a high-speed PLL input clock of (3.5×N) MHz is required.

For example, in a digital copying machine operating with a 60 MHz (N=60) image transfer clock, a 210 MHz PLL input clock is required. In the case of a pulse width modulating circuit requiring a pulse width modulation signal with a smaller pulse width, the image transfer clock frequency is limited and hardly feasible.

Specifically, if the division number is increased from 8-division to 16-division or 32-division in order to enhance the image quality, an image transfer clock twice or four times as high as the clock for the 8-division is required, and this is hardly feasible (as of September 1999, process: 0.35 μm, C-MOS).

Furthermore, where a pulse width modulation circuit is to be realized in a wide-band frequency range, a plurality of PLLs are required and this increase the scale of the circuit. As regards the cost, the PLLs need to be incorporated in the circuit (plural PLLs being required to cover a wide band) and this increases the cost. The pulse width modulation circuit using a PLL has problems in various aspects.

Besides, in the conventional pulse width modulation system, information from the pulse width modulation circuit, for example, a signal indicating whether a modulated pulse width has a desired division number, is not transmitted to the CPU or microcomputer. Consequently, a variance in the pulse width modulation circuit due to an ambient variation such as temperature or supply voltage cannot be detected.

BRIEF SUMMARY OF THE INVENTION

The object of the present invention is to provide a pulse width modulation system capable of realizing a pulse width modulation circuit with an inexpensive structure matching with modern higher-speed image transfer clocks and realizing a high-precision pulse width modulation coping with an ambient variation by a communication control with a CPU or a microcomputer, and an image forming apparatus having the pulse width modulation system and forming images.

In order to achieve this object, according to the present invention, there is provided a pulse width modulation system comprising a pulse width modulation circuit for outputting a necessary pulse width modulation signal in response to an input signal, and control means for controlling the pulse width modulation circuit, wherein the control means has means for outputting a delay setting signal and a division number setting signal to the pulse width modulation circuit in accordance with a phase comparison result signal output from the pulse width modulation circuit, and the pulse width modulation circuit comprises: switch control means for executing a control to generate a clock start signal, an EVEN-side data signal, an ODD-side data signal, an EVEN-side pulse start position signal, an ODD-side pulse start position signal and an EVEN/ODD switch signal, on the basis of a clock signal, a data signal and a pulse start position signal which are input; delay setting means for providing predetermined amounts of delay to the clock start signal from the switch control means, on the basis of the delay setting signal from the control means, and generating a plurality of pulse width modulation signals; phase select means for selecting one of the plurality of pulse width modulation signals generated by the delay setting means, on the basis of the division number setting signal from the control means, and outputting the selected signal as a clock end signal; comparison means for comparing the clock end signal from the phase select means with the clock start signal and outputting the phase comparison result signal to the control means; first select means for selecting an EVEN-side pulse width modulation signal candidate from the plurality of pulse width modulation signals generated from the delay setting means, on the basis of the EVEN-side data signal and the EVEN-side pulse start position signal generated from the switch control means; second select means, provided in parallel to the first select means, for selecting an ODD-side pulse width modulation signal candidate from the plurality of pulse width modulation signals generated from the delay setting means, on the basis of the ODD-side data signal and the ODD-side pulse start position signal generated from the switch control means; and switch means for receiving the EVEN-side pulse width modulation signal candidate selected by the first select means and the ODD-side pulse width modulation signal candidate selected by the second select means, selecting either the EVEN-side pulse width modulation signal candidate or the ODD-side pulse width modulation signal candidate in accordance with the EVEN/ODD switch signal from the switch control means, and outputting the selected candidate as the pulse width modulation signal.

There is also provided a pulse width modulation system comprising a pulse width modulation circuit for outputting a necessary pulse width modulation signal in response to an input signal, and control means for controlling the pulse width modulation circuit, wherein the control means has means for outputting a delay setting signal and a division number setting signal to the pulse width modulation circuit in accordance with a phase comparison result signal output from the pulse width modulation circuit, and the pulse width modulation circuit comprises: switch control means for executing a control to generate a clock start signal and an EVEN/ODD switch signal, on the basis of an input clock signal; delay setting means for providing predetermined amounts of delay to the clock start signal from the switch control means, on the basis of the delay setting signal from the control means, and generating a plurality of pulse width modulation signals; phase select means for selecting one of the plurality of pulse width modulation signals generated by the delay setting means, on the basis of the division number setting signal from the control means, and outputting the selected signal as a clock end signal; comparison means for comparing the clock end signal from the phase select means with the clock start signal and outputting the phase comparison result signal to the control means; select means for selecting a pulse width modulation signal candidate from the plurality of pulse width modulation signals generated from the delay setting means, on the basis of the data signal and the pulse start position signal which have been input; inverting means for inverting a polarity of the pulse width modulation signal candidate selected by the select means; and switch means for receiving the pulse width modulation signal candidate inverted by the inverting means and the pulse width modulation signal candidate selected by the second select means, selecting either the pulse width modulation signal candidate inverted by the inverting means or the pulse width modulation signal candidate selected by the second select means in accordance with the EVEN/ODD switch signal from the switch control means, and outputting the selected candidate as the pulse width modulation signal.

There is also provided an image forming apparatus comprising: pulse width modulation means for outputting a necessary pulse width modulation signal in response to an input signal; image forming means for forming an image on an image formation medium on the basis of the pulse width modulation signal output from the pulse width modulation means; control means for controlling a pulse width modulation of the pulse width modulation means by detecting delay variation characteristics of the pulse width modulation means; and execution means for executing a control by the control means at a time of a predetermined operation.

BRIEF DESCRIPTION OF THE SEVERAL VIEWS OF THE DRAWING

FIGS. 1A to 1C show an example of a technique for enhancing an image quality by a laser modulation;

FIGS. 7A to 7C are views illustrating detailed structures of the pulse width modulation circuit shown in FIG. 6;

FIGS. 13A and 13B are views for describing a detailed structure of the pulse width modulation circuit shown in FIG. 12;

DETAILED DESCRIPTION OF THE INVENTION

An embodiment of the present invention will now be described with reference to the accompanying drawings.

Figure 4:
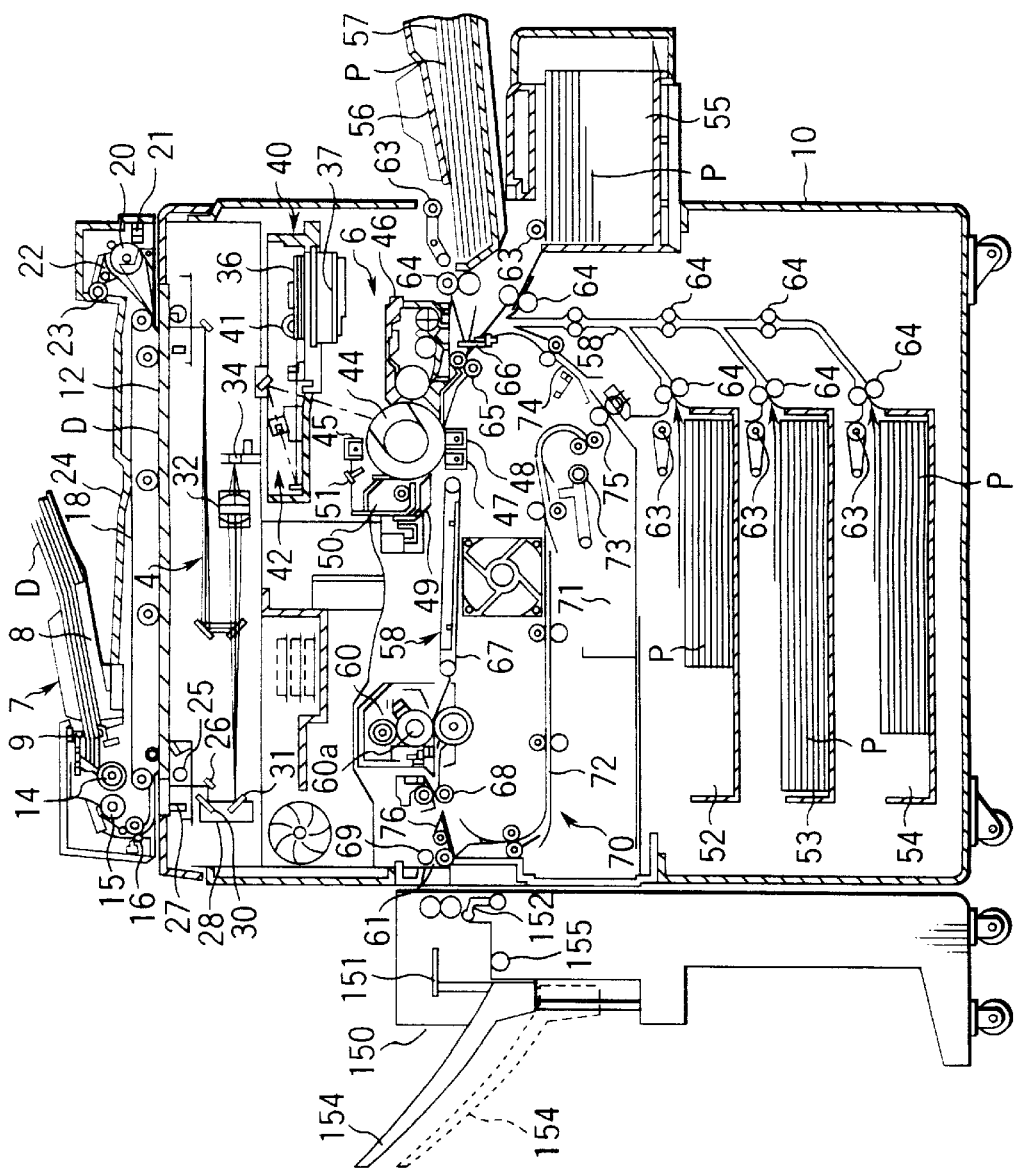
FIG. 4 is a cross-sectional view of an internal structure of a digital copying machine using a 4-channel output CCD matching with a high-speed operation according to the present invention.

FIG. 4 is a cross-sectional view showing an internal structure of a digital copying machine (DPPC) using a 4-channel output CCD (4-division photoelectric conversion element) capable of performing high-speed processing according to the present invention. As is shown in FIG. 4, the digital copying machine has an apparatus main body 10. The apparatus main body 10 incorporates a scanner section 4 functioning as an image reading means and a printer section 6 functioning as an image forming means.

An original table 12 formed of transparent glass, on which a read object, i.e. an original D is placed, is disposed on the upper surface of the apparatus main body 10. An automatic document feeder 7 (hereinafter referred to as "ADF") for automatically feeding originals onto the original table 12 is disposed on the upper surface of the apparatus main body 10. The ADF 7 is disposed to be opened/closed with respect to the original table 12 and serves as an original cover for bringing the original D placed on the original table 12 into close contact with the original table 12.

The ADF 7 has an original tray 8 on which the original D is set; an empty sensor 9 for detecting the presence/absence of originals; pickup rollers 14 for picking up originals on the original tray 8 one by one; a feed roller 15 for conveying the picked-up original; an aligning roller pair 16 for aligning the leading edges of the originals; and a conveyor belt 18 disposed to cover almost the entire surface of the original table 12. A plurality of originals set on the original tray 8 with their surfaces facing up are sequentially taken out from the lowermost page, i.e. the last page, aligned by the aligning roller pair 16, and conveyed to a predetermined position on the original table 12 by the conveyor belt 18.

In the ADF 7, a reversing roller 20, a non-reverse sensor 21, a flapper 22 and a delivery roller 23 are disposed at the end portion on the opposite side of the aligning roller pair 16 with respect to the conveyor belt 18. The original D whose image information has been read by the scanner section 4 (to be described later) is fed from the original table 12 by the conveyor belt 18 and delivered to an original delivery section 24 on the ADF 7 through the reversing roller 20, flapper 21 and delivery roller 22. To read the lower surface of the original D, the flapper 22 is switched. The original D conveyed by the conveyor belt 18 is reversed by the reversing roller 20 and fed to a predetermined position on the original table 12 again by the conveyor belt 18.

The scanner section 4 provided in the apparatus main body 10 has an exposure lamp 25 as a light source for illuminating the original D placed on the original table 12, and a first mirror 26 for deflecting reflection light from the original D in a predetermined direction. The exposure lamp 25 and first mirror 26 are attached to a first carriage 27 disposed under the original table 12.

The first carriage 27 is disposed to be movable in parallel to the original table 12 and reciprocally moved under the original table 12 by a scanning motor 35 (to be described later) through a toothed belt (not show), etc.

A second carriage 28 movable in parallel to the original table 12 is disposed under the original table 12. Second and third mirrors 30 and 31 for sequentially deflecting reflection light from the original D, which has been deflected by the first mirror 26, are attached to the second carriage 28 at right angles with each other. The second carriage 28 is moved by, e.g. the toothed belt for driving the first carriage 27 along with the first carriage 27, and moved in parallel along the original table 12 at half the speed of the first carriage.

A focusing lens 32 for focusing reflection light from the third mirror 31 mounted on the second carriage 28, and a 4-channel output CCD (photoelectric conversion element) 34 for receiving the reflected light focused by the focusing lens and photo-electrically converting it are also disposed under the original table 12. The focusing lens 32 is disposed in a plane including the optical axis of the light deflected by the third mirror 31 so as to be movable by means of a driving mechanism. The focusing lens 32 moves to focus the reflection light at a desired magnification. The 4-channel output CCD 34 photoelectrically converts the incoming reflection light and outputs an electrical signal corresponding to the read original D.

On the other hand, the printer section 6 has a laser exposure unit 40 functioning as a latent image forming means. The laser exposure unit 40 comprises a semiconductor laser 41 as a light source; a polygon mirror 36 as a scanning member for continuously deflecting a laser beam emitted by the semiconductor laser 41; a polygon motor 37 as a scanning motor for rotatably driving the polygon mirror 36 at a predetermined rotational speed (to be described later);

and an optical system 42 for deflecting the laser beam from the polygon mirror and guiding the beam to a photosensitive drum 44 (to be described later). The laser expo sure unit 40 with the above structure is fixed to a support frame (not shown) of the apparatus main body 10.

The semiconductor laser 41 is ON/OFF-controlled in accordance with the image information of the original D read by the scanner section 4 or facsimile transmission/ reception document information. The laser beam is directed to the photosensitive drum 44 through the polygon mirror 36 and optical system 42 to scan the outer surface of the photosensitive drum 44, thereby forming an electrostatic latent image on the outer peripheral surface of the photosensitive drum 44.

The printer section 6 has the rotatable photosensitive drum 44 as an image carrier disposed almost at the center of the apparatus main body 10. The outer peripheral surface of the photosensitive drum 44 is exposed to the laser beam from the laser exposure unit 40, and so a desired electrostatic latent image is formed thereon. Around the photosensitive drum 44, the following elements are arranged in the named order: a charger 45 for electrifying the outer peripheral surface of the drum with a predetermined charge; a developing device 46 for supplying toner as a developer to the electrostatic latent image formed on the outer peripheral surface of the photosensitive drum 44 to develop it at a desired image density; a transfer charger 48 which is integrated with a separation charger 47 for separating a target transfer material, i.e. a copy paper sheet P fed from a paper cassette (to be described later) from the photosensitive drum 44 and transfers the toner image formed on the photosensitive drum 44 onto the paper sheet P; a separation gripper 49 for separating the copy paper sheet P from the outer peripheral surface of the photosensitive drum 44; a cleaning unit 50 for removing toner remaining on the outer peripheral surface of the photosensitive drum 44; and a discharger 51 for de-electrifying the outer peripheral surface of the photosensitive drum 44.

An upper cassette 52, a middle cassette 53 and a lower cassette 54 which can be drawn out of the apparatus main body are stacked at the lower portion of the apparatus main body 10. These cassettes store copy paper sheets of different sizes. A large-capacity feeder 55 is disposed on one side of these cassettes. This large-capacity feeder 55 stores about 3,000 copy paper sheets P having a size with high use frequency, e.g. copy paper sheets P with A4 size. A feed cassette 57 also serving as a manual feed tray 56 is detachably attached above the large-capacity feeder 55.

A convey path 58 extending from the cassettes and large-capacity feeder 55 through a transfer section located between the photosensitive drum 44 and transfer charger 48 is formed in the apparatus main body 10. A fixing unit 60 having a fixing lamp 60a is disposed at the end of the convey path 58. A delivery port 61 is formed in the side wall of the apparatus main body 10, which is opposed to the fixing unit 60. A single-tray finisher 150 is attached to the delivery port 61.

Pickup rollers 63 for extracting the paper sheets P one by one from the cassettes or large-capacity feeder are arranged near each of the upper cassette 52, middle cassette 53, lower cassette 54 and feed cassette 57 and near the large-capacity feeder 55. A number of feed roller pairs 64 for conveying the copy paper sheet P extracted by the pickup rollers 63 through the convey path 58 are arranged in the convey path 58.

A registration roller pair 65 is arranged in the convey path 58 on the upstream side of the photo-sensitive drum 44. The registration roller pair 65 corrects a tilt of the extracted copy paper sheet P, registers the leading edge of the toner image on the photosensitive drum 44 and the leading edge of the copy paper sheet P, and feeds the copy paper sheet P to the transfer section at the same speed as the speed of movement of the outer peripheral surface of the photosensitive drum 44. A prealigning sensor 66 for detecting arrival of the copy paper sheet P is provided on the feed roller 64 side.

Each copy paper sheet P extracted from the cassette or large-capacity feeder 55 by the pickup rollers 63 is fed to the registration roller pair 65 by the feed roller pair 64. After the leading edge of the copy paper sheet P is aligned by the registration roller pair 65, the copy paper sheet P is fed to the transfer section.

In the transfer section, a development image, i.e. toner image formed on the photosensitive drum 44 is transferred onto the paper sheet P by the transfer charger 48. The copy paper sheet P on which the toner image has been transferred is separated from the outer peripheral surface of the photosensitive drum 44 by the function of the separation charger 47 and separation gripper 49 and conveyed to the fixing unit 60 through a conveyor belt 67 constituting part of the convey path 52. After the developer image is melted and fixed on the copy paper sheet P by the fixing unit 60, the copy paper sheet P is delivered onto the finisher 150 through the delivery port 61 by a feed roller pair 68 and a delivery roller pair 69.

An automatic double-side unit 70 for reversing the copy paper sheet P which has passed through the fixing unit 60 and feeding it to the registration roller pair 65 again is provided under the convey path 58. The automatic double-side unit 70 comprises a temporary stack 71 for temporarily stacking the copy paper sheets P; a reversing path 72 branched from the convey path 58 to reverse the copy paper sheet P which has passed through the fixing unit 60 and to guide the copy paper sheet P to the temporary stack 71; pickup rollers 73 for extracting the copy paper sheets P stacked on the temporary stack one by one; and a feed roller 75 for feeding the extracted paper sheet to the registration roller pair 65 through a convey path 74. A selector gate 76 for selectively distributing the copy paper sheets P to the delivery port 61 or reversing path 72 is provided at the branch portion between the convey path 58 and reversing path 72.

Where double-copying is performed, the copy paper sheet P which has passed through the fixing unit 60 is guided to the reversing path 72 by the selector gate 76, temporarily stacked on the temporary stack 71 in a reversed state, and fed to the registration roller pair 65 through the convey path 74 by the pickup rollers 73 and feed roller 75. The copy paper sheet P is registered by the registration roller pair 65 and fed to the transfer section again to transfer a toner image onto the reverse surface of the copy paper sheet P. Thereafter, the copy paper sheet P is delivered to the finisher 150 through the convey path 58, fixing unit 60 and delivery rollers 69.

The finisher 150 staples delivered copies of documents and stores them in units of a copy. Each time a copy paper sheet P to be stapled has been delivered from the delivery port 61, a guide bar 151 aligns the copy paper sheet P to the stapling side. When all paper sheets have been delivered, a copy of copy paper sheets P is pressed by a paper press arm 152 and stapled by a stapler unit (not shown). Then the guide bar 151 moves downward. The stapled copy paper sheets P are delivered to a finisher delivery tray 154 by a finisher delivery roller 155 in units of a copy. The downward movement amount of the finisher delivery tray 154 is roughly determined in accordance with the number of copy paper sheets P to be delivered, and the finisher delivery tray 154 moves downward stepwise every time one copy is delivered. The guide bar 151 for aligning the delivered copy paper sheets P is located at such a high position that the guide bar 151 may not abut upon the already stapled copy paper sheets P placed on the finisher delivery tray 154.

The finisher delivery tray 154 is connected to a shift mechanism (not shown) which shifts (e.g. in four directions: front, rear, left and right sides) in units of a copy in the sort mode.

An operation panel 380 for inputting various copy conditions and a copy start signal for starting copying operation is provided at the upper portion on the front side of the apparatus main body 10.

A control system of the digital copying machine will now be described with reference to FIG. 5.

The control system of the digital copying machine is roughly divided into three blocks: a basic section 301 in which the scanner section 4 and printer section 6 are connected through an image processing section 5 to construct the digital copying machine; a page memory section 302 which receives image data from the basic section 301, records it, and transfers the recorded image data to the basic section 301 again to realize memory copy (electronic sort); and an expansion section 303 constructed by a mother board comprising a hard disk (HD) serving as a secondary memory for storing compressed image data in the page memory section 302, a FAX board (G4/G3·FAX control means) 369 for transmitting/receiving compressed image data to/from an external device through a public line, a LAN board (local area network line control means) 371 used to transfer data through a LAN, an expansion section CPU 361 for controlling these means through a system bus 373 and an ISA bus 374, a main memory 361a used by the expansion section CPU 361, and a DMAC 362 for controlling DMA transfer on the ISA bus 374.

The basic section 301 and page memory section 302 are connected through a basic section system interface 316 used to transfer control data and a basic section image interface 317 used to transfer image data. The page memory section 302 and expansion section 303 are connected through an expansion section system interface 376 used to transfer control data and an expansion section image interface 377 used to transfer image data.

The basic section 301 comprises the input means (scanner section) 4, output means (printer section) 6, image processing section 5, and a CPU 1 for controlling these means.

The scanner section 4 has the 4-channel output CCD 34 having a plurality of light-receiving elements (1-line CCD) arrayed in lines. The 4-channel output CCD 34 reads the image of an original placed on the original table 12 in units of a line in accordance with an instruction from the CPU 1, converts the density of the image into 8-bit digital data, and outputs the data to the image processing section 5 through a scanner interface (not shown) as time-series digital data along with a sync signal.

The CPU 1 controls the means in the basic section 301 and means in the page memory section 302 (to be described later).

The page memory section 302 controls control information communication between the CPU 1 in the basic section 301 and the expansion section CPU 361 in the expansion section 303, or controls access from the basic section 301 and expansion section 303 to a page memory 323. The page memory section 302 comprises a system control means 304 incorporating a communication 305; the storage means (page memory) 323 for temporarily storing image data; an address control section 306 for generating an address of the page memory 323; an image bus 320 used for data transfer between the respective devices in the page memory section 302; a control bus 321 used to control signal transfer between the respective devices in the page memory section 302 and the system control means 304; a data control means 307 for controlling data transfer in a case of data transfer between the page memory 323 and another device through the image bus 320; an image data I/F means 308 for interfacing image data in image data transfer with the basic section 301 through the basic section image interface 317; a resolution conversion/binarization rotation means 325 for, when imaged data is to be transmitted to a device with a different resolution, converting the image data in accordance with the resolution of this device, converting image data received from a device with a different resolution in accordance with the resolution of the printer section 6 of the basic section 301, or executing 90° rotation processing of binary image data; a compression/expansion means 324 for compressing input image data for a device for compressing image data and transmitting or storing it as in facsimile transmission or optical disk storage, or expanding compressed image data to make it visible through the printer section 6; and a multi-value rotation memory 309 connected to the image data I/F 308 to output the image data from the printer section 6 while rotating it through 90° or −90°.

The expansion section 303 comprises the control means (expansion section CPU) 361 for controlling the devices in the expansion section 303 through the expansion section system bus 373; main memory 361a used by the expansion section CPU 361; general-purpose ISA bus 374; an ISA bus controller (ISA·B/C) 363 for interfacing the expansion section system bus 373 and ISA bus 374; the DMA controller (DMAC) 362 for controlling data transfer on the ISA bus 374; a storage means (HDD) 365 connected to the ISA bus 374 to electronically store image data; an HD·FD interface (HD·FDI/F) 364 as the interface of the HDD; a storage means (optical disk device; ODD) 368 connected to the ISA bus 374 to electronically store image data; an SCSI interface 367 as the interface thereof; the local area network line control means (LAN) 371 used to realize a LAN function; a printer controller means 370 used to realize a printer function; the G4/G3·FAX control means 369 having a G4/G3·FAX control function; and an expansion section image bus 375 used to output image data from the printer controller means 370 to the page memory section 302 through the system image interface 377.

A hard disk HD incorporated in the HDD 365 stores compressed image data as files in units of a page or a document having a plurality of pages, which are managed by search data for searching for the documents.

The above-described operation panel 80 having a keyboard for inputting instructions to the expansion section 303 and a display is connected to the expansion section system bus 373.

The storage means (ODD) 368 is connected to the ISA bus 374 through the SCSI interface 367. The expansion section CPU 361 controls the storage means 368 through the expansion section system bus 373, ISA·B/C 63, and ISA bus 374 using SCSI commands.

The image data I/F means (image data control means) 308 will be described next. The image data I/F means 308 is a device on the image bus 320 which performs image data transfer between the scanner section 4 or printer section 6 and the page memory 323 through the image processing section 5. The image data I/F means 308 also performs image data transfer between, e.g. the printer controller 370 connected to the expansion section image bus 375 in the expansion section 303 and the page memory 323.

The page memory 323 of the page memory section 302 has a large memory space.

A first embodiment will now be described.

Figure 6:
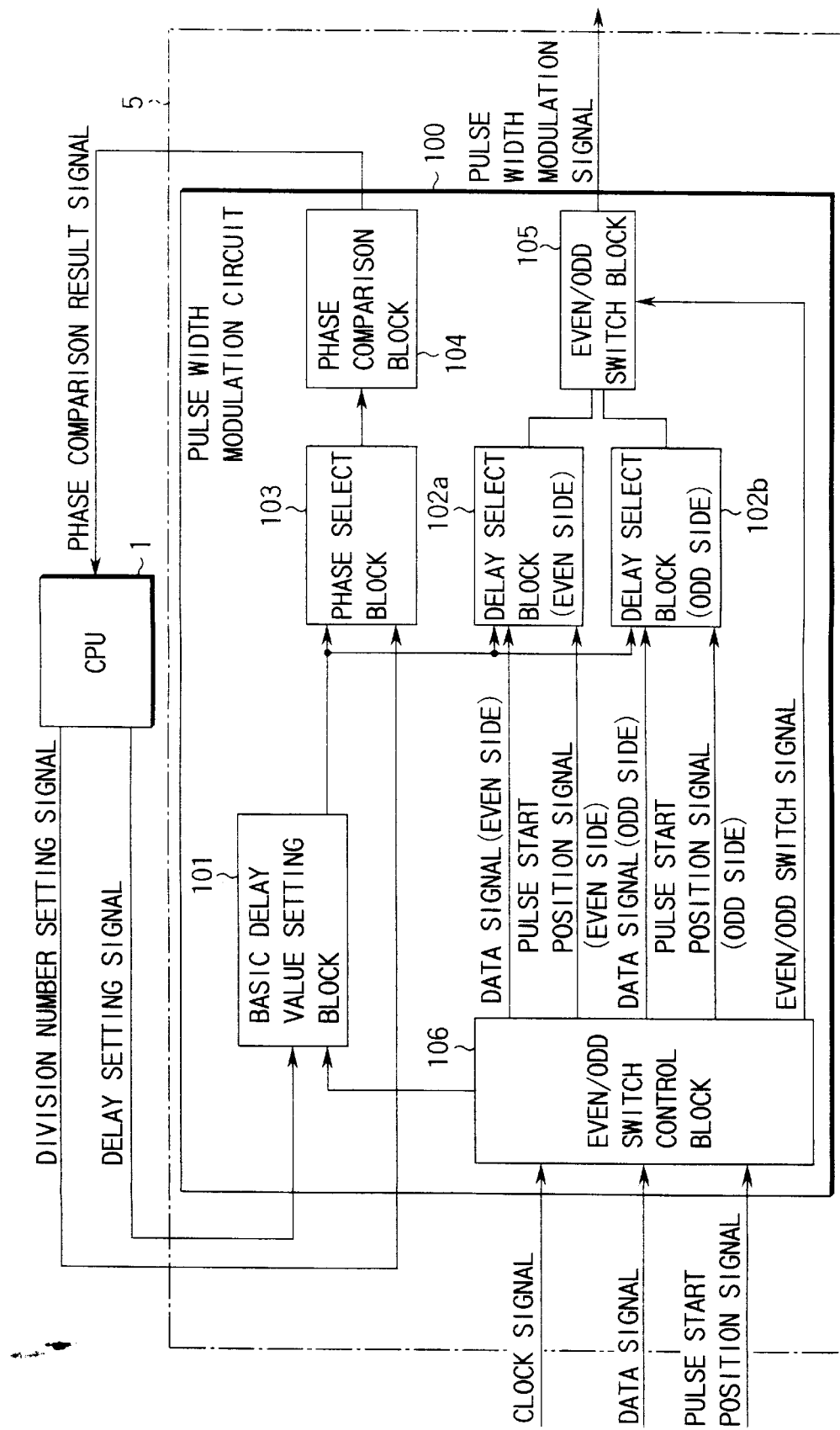
FIG. 6 is a block diagram showing a schematic structure of a pulse width modulation system according to a first embodiment.

FIG. 6 shows a schematic structure of a pulse width modulation system according to the first embodiment.

Figure 5:
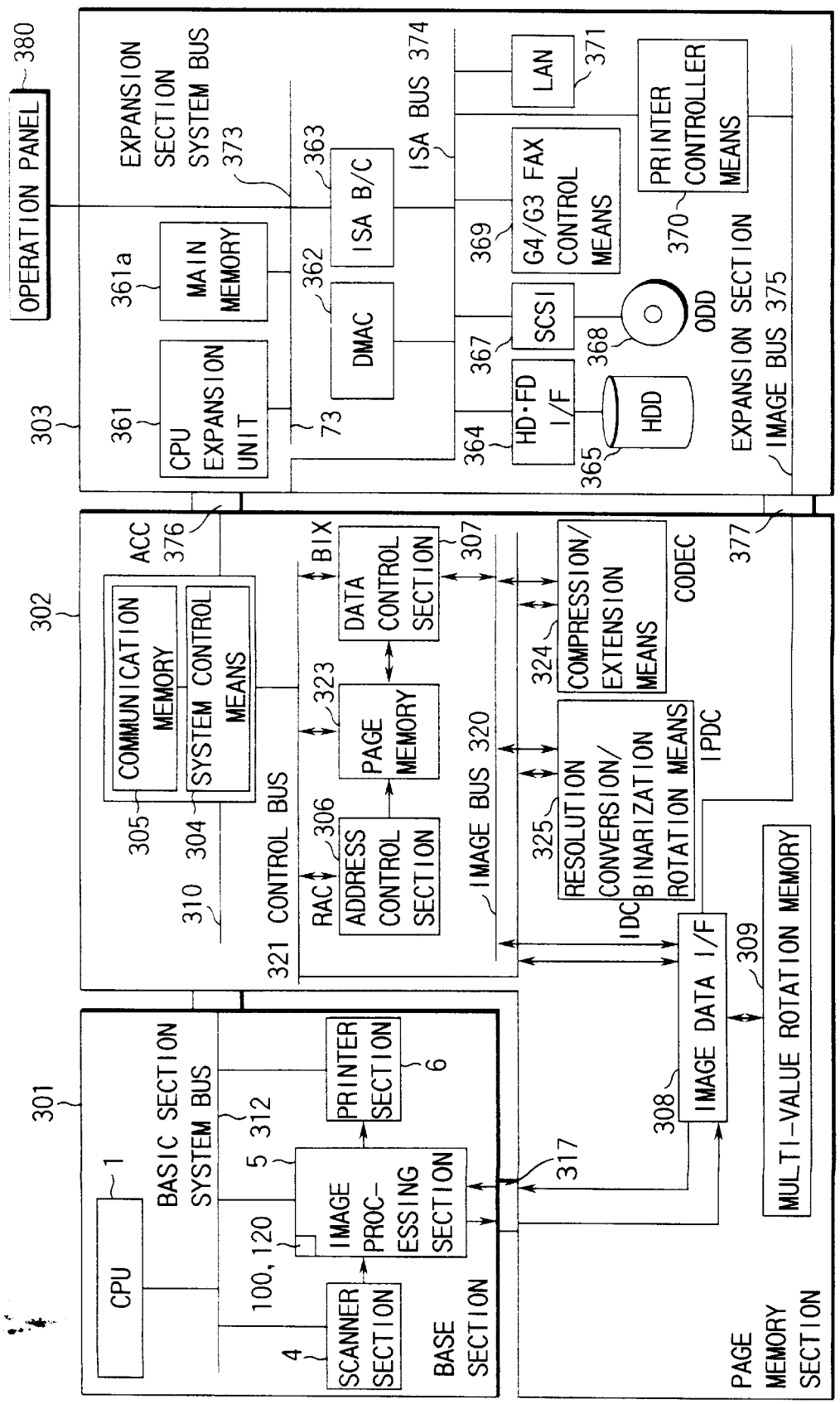
FIG. 5 shows a schematic structure of a control system of the digital copying machine.

This is a combination of a pulse width modulation circuit 100 in the image processing section 5 shown in FIG. 5 and the circuit of the CPU 1.

The pulse width modulation circuit 100 comprises six kinds of blocks. The pulse width modulation circuit 100 comprises a basic delay value setting block 101, delay select blocks 102a, 102b, a phase select block 103, a phase comparison block 104, an EVEN/ODD switch block 105, and an EVEN/ODD switch control block 106.

The pulse width modulation circuit 100 receives a data signal (emission time information) as a basis for pulse width modulation, a clock signal (image transfer clock), a pulse start position signal (emission start position information), and a delay setting signal and a division number setting signal from the CPU 1, and outputs a phase comparison result signal and a pulse width modulation signal on the basis of these input signals.

Figure 7A:
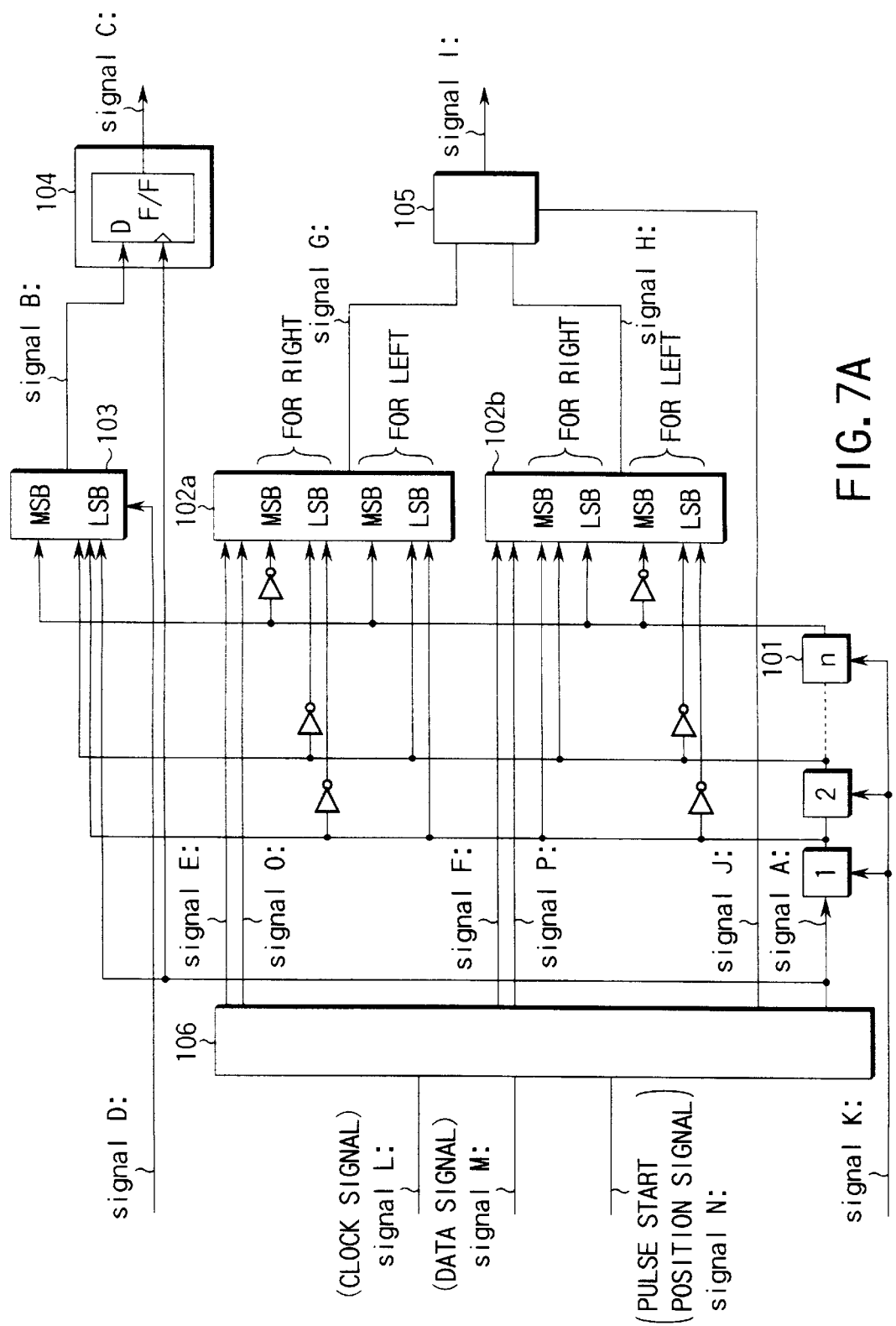

FIGS. 7A to 7C show a detailed structure of the pulse width modulation circuit 100 shown in FIG. 6.

The basic delay value setting block 101 shown in FIG. 7A can set a $2^m$ number of basic delays on the basis of a signal K (an m-bit delay setting signal). The basic delay value setting block 101 inputs a signal A (a clock start signal (a 2-division signal of an original oscillation clock)) and delivers outputs with delays.

The delay select block 102a, 102b shown in FIG. 7A receives n-bit signals with delays provided by the basic delay value setting block 101 and a signal E/F (a data signal (EVEN side/ODD side)). The delay select block 102a, 102b outputs a signal, which is selected from the signals delayed by the basic delay value setting block 101 on the basis of the data signal, as a signal G/H (a pulse width modulation signal (EVEN side/ODD side)). This signal is output from the EVEN/ODD switch block 105 as a pulse width modulation signal. Similarly, the delay select block 102a, 102b receives a signal O/P (a pulse start position signal (EVEN side/ODD side)). If this signal is "1", a pulse width modulation signal is output from the right side. If this signal is "0", a pulse width modulation signal is output from the left side.

The phase select block 103 shown in FIG. 7A receives n-bit signals with delays provided by the basic delay value setting block 101 as well as a signal D (an n-bit division number setting signal). The phase select block 103 outputs a signal, which is selected from the signals delayed by the basic delay value setting block 101 on the basis of the division number setting signal, as a signal B (a clock end signal).

The phase comparison block 104 shown in FIG. 7A receives the signal B (clock end signal (CLK_END)) from the phase select block 103 and the signal A (clock start signal (CLK_END)) without delay.

The EVEN/ODD switch control block 106 shown in FIG. 7A receives a signal L (clock signal), a signal M (data signal) and a signal N (pulse start position signal).

Based on these signals, the EVEN/ODD switch control block 106 generates the signal A (clock start signal (2-division signal of original oscillation clock)), signal E/F (data signal (EVEN side/ODD side)), a signal J (an EVEN/ODD switch signal), and signal O/P (pulse start position signal (EVEN side/ODD side)). By virtue of the control of the EVEN/ODD switch control block 106, high-speed processing can be performed and no spike is prevented from propagating to the pulse width modulation signal.

Figure 8:
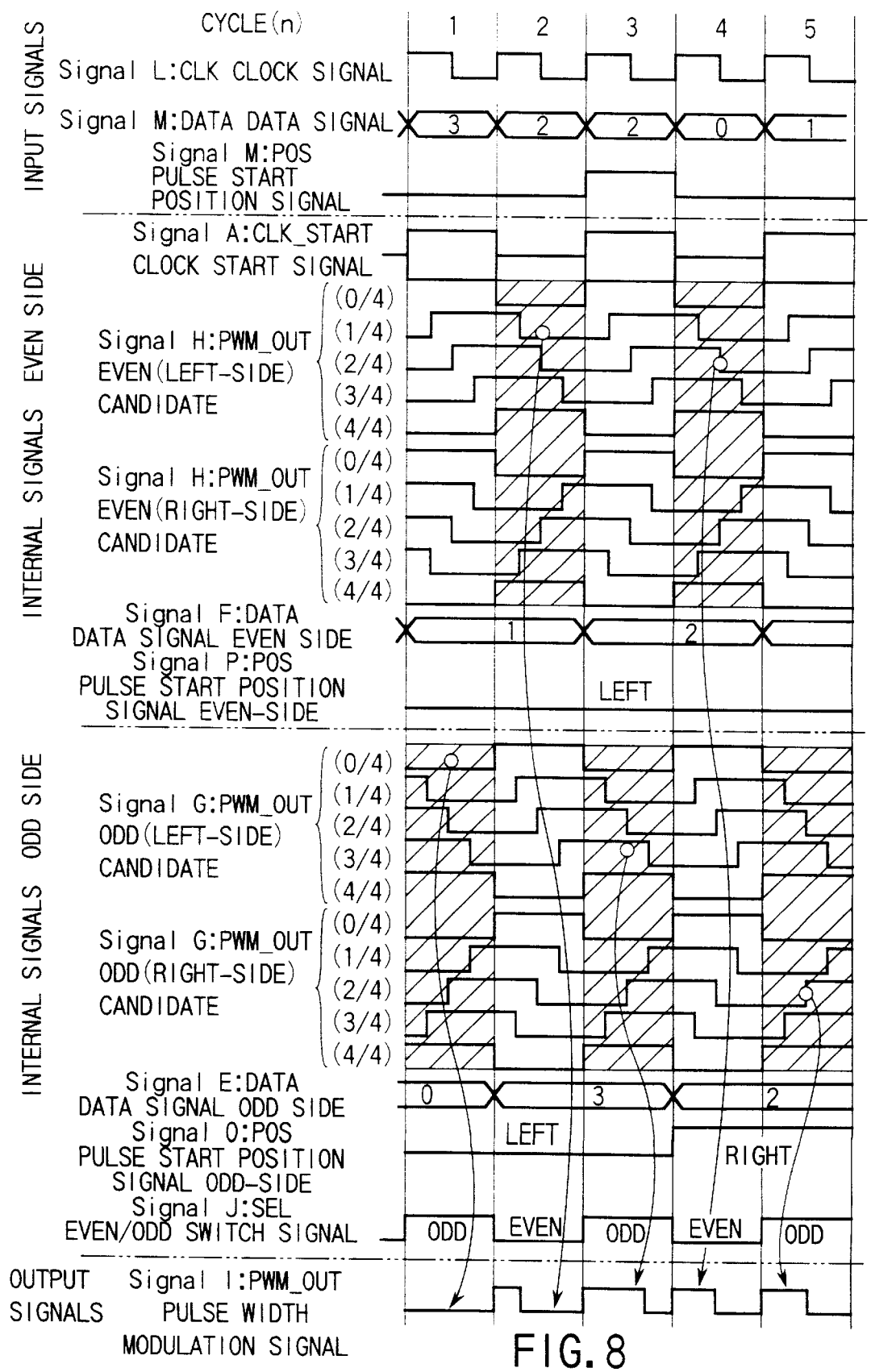
FIG. 8 is a timing charts of various signals.

FIG. 8 is a timing charts of the respective signals. This timing chart represents the operation of the pulse width modulation circuit 100 shown in FIG. 7A by means of waveforms.

For instance, the timing chart shows waveforms of the respective signals obtained by 4-division pulse width modulation.

The EVEN/ODD switch control block 106 receives the signal L (clock signal), signal M (data signal) and signal N (pulse position start signal) and outputs a signal I (pulse width modulation signal). The other signals indicates internal signals in the pulse width modulation circuit 100. It should be noted, however, that the signal D, K sets a given value.

On the basis of the data signal, pulse position start signal and clock signal, the following signals are generated: the signal F (EVEN-side DATA signal), signal O (EVEN-side pulse position start signal), signal E (ODD-side data signal), signal P (ODD-side pulse position start signal), 2-division signal A of CLK signal (clock start signal) and signal J (EVEN/ODD switch signal).

The signals F, E both are 2-division cycle signals of the signal M (data signal), and the signals O, P are also 2-division cycle signals of the signal N (pulse position start signal) and are latched for even/odd data. The signals H, G (pulse width modulation signals) are EVEN/ODD side signals where the pulse start positions are left/right sides.

The finally output signal is the signal I (pulse width modulation signal).

As regards the pulse width modulation signal, when the signal J (EVEN/ODD switch signal) is at level "1", a signal indicated by the signal E (data value (ODD side)) is selected from the ODD-side pulse width modulation candidate signals G (ODD-side pulse width modulation signals), whose pulse start position is on the left side where the signal O (pulse start position signal (ODD side)) is "0", or whose pulse start position is on the right side where the signal O (pulse start position signal (ODD side)) is "1". Thus, the pulse width modulation signal J (pulse width modulation signal) is output.

On the other hand, as regards the pulse width modulation signal, when the signal J (EVEN/ODD switch signal) is at level "0", a signal indicated by the data signal (EVEN side) is selected from EVEN-side pulse width modulation candidate signals H, whose pulse start position is on the left side where the signal O (pulse start position signal (EVEN side)) is "0", or whose pulse start position is on the right side where the signal O (pulse start position signal (ODD side)) is "1". Thus, the pulse width modulation signal J (pulse width modulation signal) is output.

Figure 9A:
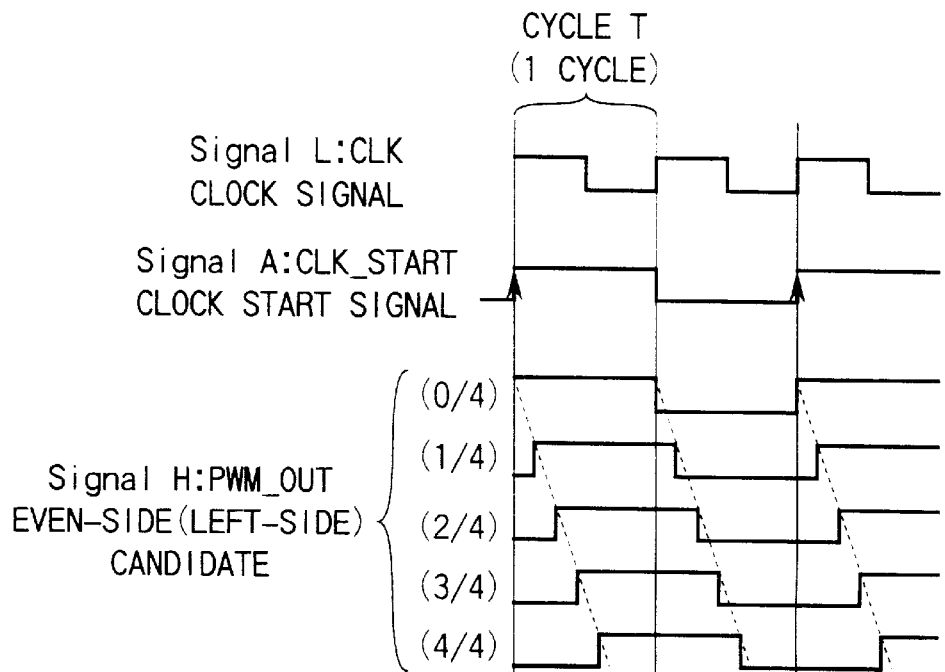
FIGS. 9A to 9C show variations in internal signals due to a variation in delay characteristics.
Figure 9B:
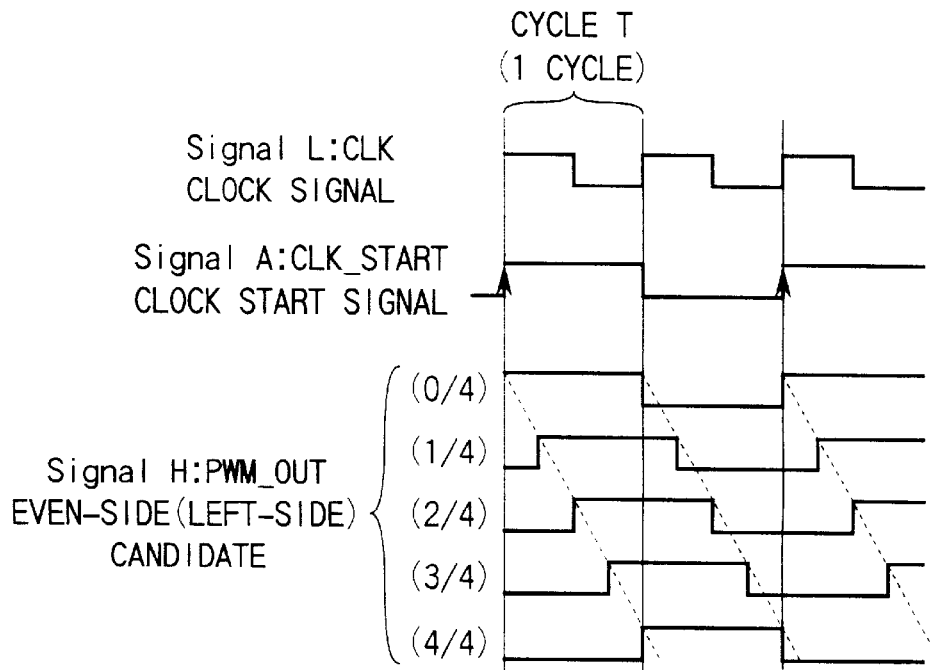
Figure 9C:
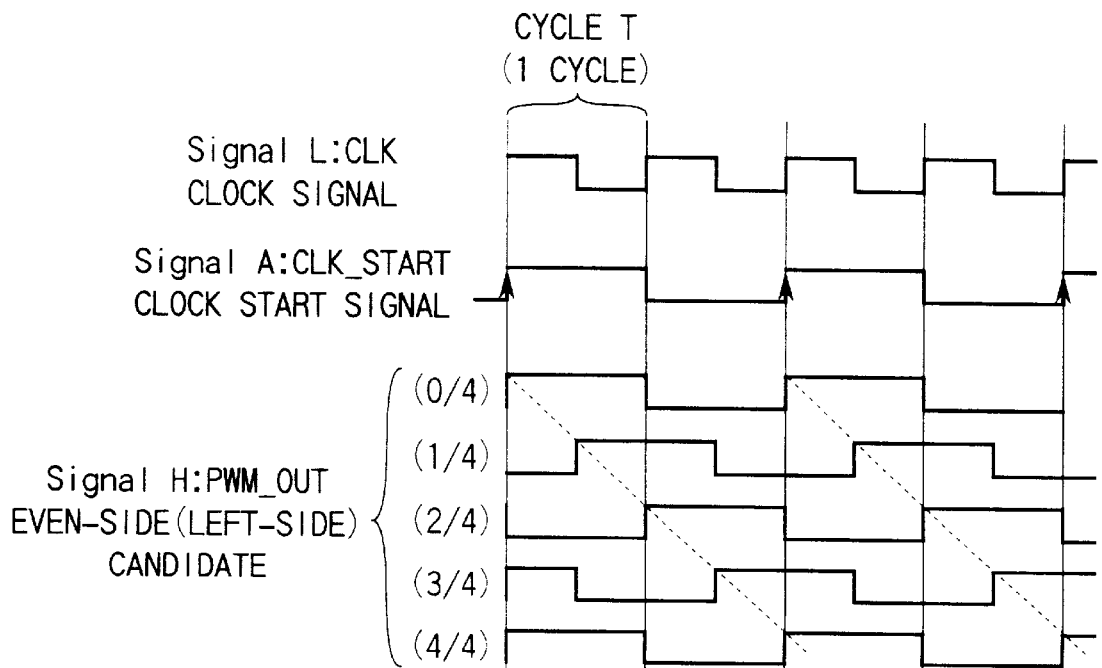

FIGS. 9A to 9C show variations of internal signals due to a variation in delay characteristics.

Specifically, FIG. 9B shows a case of 4-division pulse width modulation, and it shows an example of EVEN-side (left side) waveforms at a certain time point. Relative to one cycle of original oscillation, the phase is shifted over 45°, 90°, 135° and 180°. Assume that the delay characteristics in this state have standard TYPICAL values. These values are set in consideration of a variance range in delay characteristics.

In general, the temperature, power supply voltage and process conditions for manufacture need to be considered as factors determining a delay characteristic variation in an LSI. These variable characteristic values are multiplied.

FIG. 9A shows an example of a condition of MIN in which the delay is ½, compared to the TYPICAL condition. FIG. 9C shows an example of a condition of MAX in which the delay is doubled. Each figure shows how the waveforms will vary when the parameters of the basic delay value setting block 101, delay select block 102a, 102b and phase select block 103 are not changed.

For example, at the time of condition of MIN, even if pulse width modulation is to be effected on the original oscillation, 4-division pulse width modulation cannot be made because the delay is too small. At the time of condition of MAX, pulse width modulation cannot be made because the delay is too great.

Whether pulse width modulation is feasible is determined by sensing the state of the phase comparison result signal.

Figure 10A:
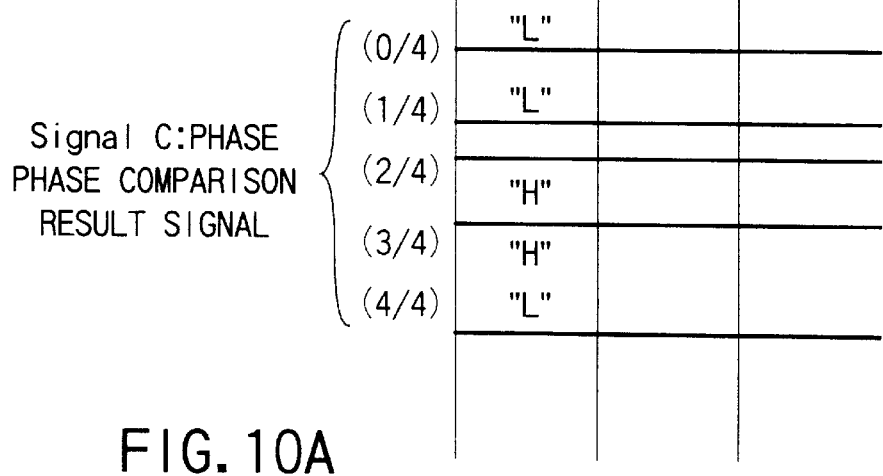
FIGS. 10A to 10C show variations in phase comparison result signals due to a variation in delay characteristics.
Figure 10B:
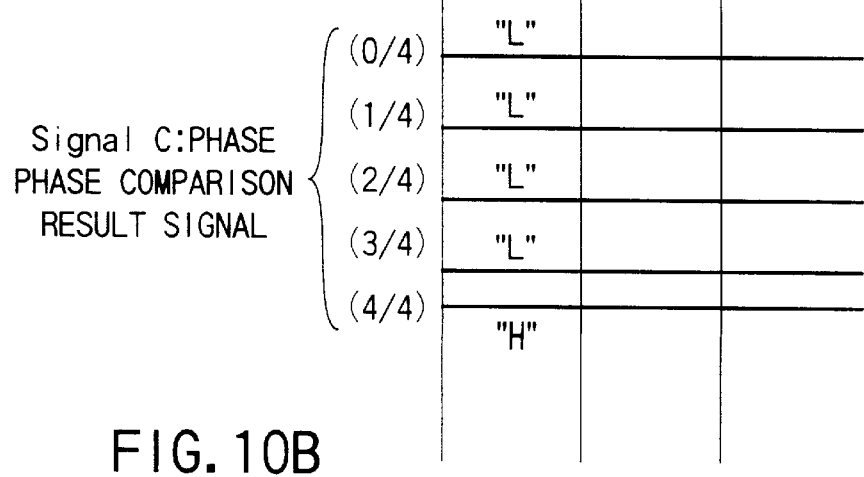
Figure 10C:
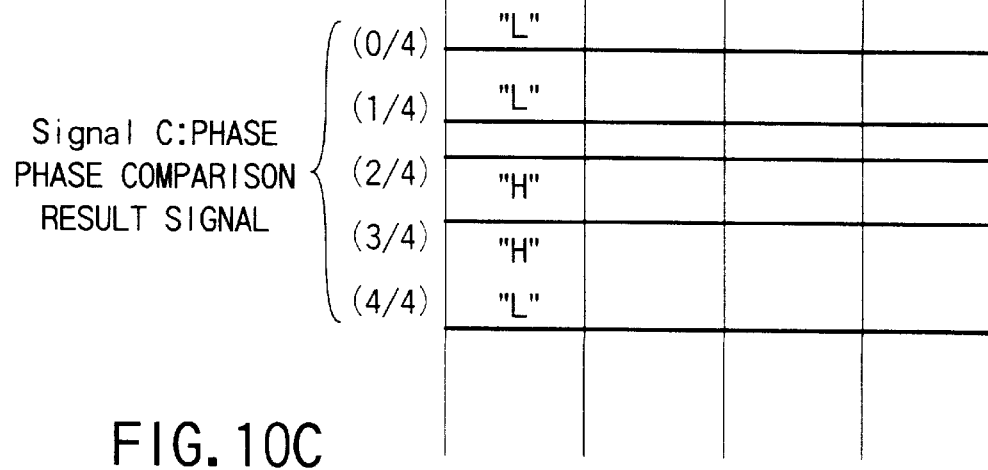

FIGS. 10A to 10C show variations in phase comparison result signals due to a variation in delay characteristics. In the figures, the output signal CLK_END from the phase select block 103 is illustrated in the state in which the signal CLK_START has arisen. Specifically, the states of the phase comparison result signal (PHASE) at the time of TYPICAL (FIG. 10B), MIN (FIG. 10A) and MAX (FIG. 10C) are shown. When the phase is shifted over 180 to 60°, the phase comparison result signal from the phase comparison block 104 takes value "1" and it takes value "0" in other cases.

In the condition of MIN in FIG. 10A, the phase of the 2-division signal of original oscillation clock is not shifted over 180° or more. Thus, the phase comparison result signal is always "L".

In the condition of TYPICAL in FIG. 10B, the phase of the 2-division signal of original oscillation clock is shifted over 180° cat the fourth division. Thus, the phase comparison result signal becomes "H" at the fourth division.

In the condition of MAX in FIG. 10C, the phase of the 2-division signal of original oscillation clock is shifted over 180° at the second and following divisions. Thus, the phase comparison result signal becomes "H". The phase is shifted over 360° at the fourth division, the signal becomes "L" once again.

Using this principle, the CPU 1 reads the state of the phase comparison result signal and varies the values of the basic delay setting signal and the division number setting signal. Even if the delay variation characteristics of the LSI constituting the pulse width variation circuit 100 vary, the exact pulse width modulation can be maintained.

Figure 11:
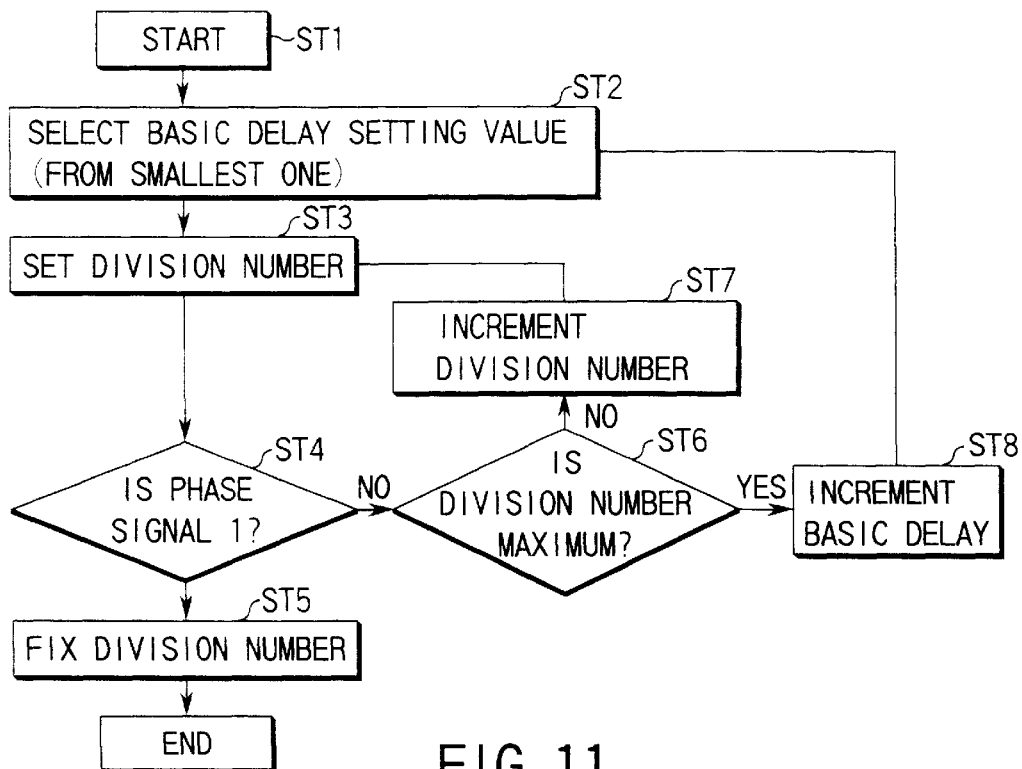
FIG. 11 is a flow chart illustrating a control to exactly effecting a pulse width modulation.

Referring to a flow chart of FIG. 11, a description will now be given of the control for exactly effecting the pulse width modulation by sensing and determining whether the delay variation characteristics of the LSI constituting the pulse width variation circuit 100 have varied.

To start with, the CPU 1 begins to monitor whether the delay variation characteristics of the pulse width variation circuit 100 have varied (ST1).

The CPU 1 selects the basic delay setting value in the basic delay value setting block 101 from the smallest one (ST2).

The CPU 1 sets the division number in the phase select block 103 from a given minimum desired division number for pulse width modulation (ST3).

Then, the CPU 1 senses the level of the phase comparison result signal (PHASE) from the pulse width modulation circuit 100 (ST4).

If the phase comparison result signal is stable at "1" (ST4), the CPU 1 fixes the division number (ST5).

In step ST4, if the phase comparison result signal is "0", the result of (basic delay value×division number) does not meet the cycle to be locked. Thus, the CPU 1 determines whether the division number or the basic delay value should be increased.

If the division number is not maximum (ST6), the CPU 1 increases the division number (ST7) and goes back to the division number setting in step ST3.

If the division number is maximum (ST6), the CPU 1 increases the basic delay (ST8) and goes back to the basic delay setting in step ST2.

A second embodiment will now be described.

Figure 12:
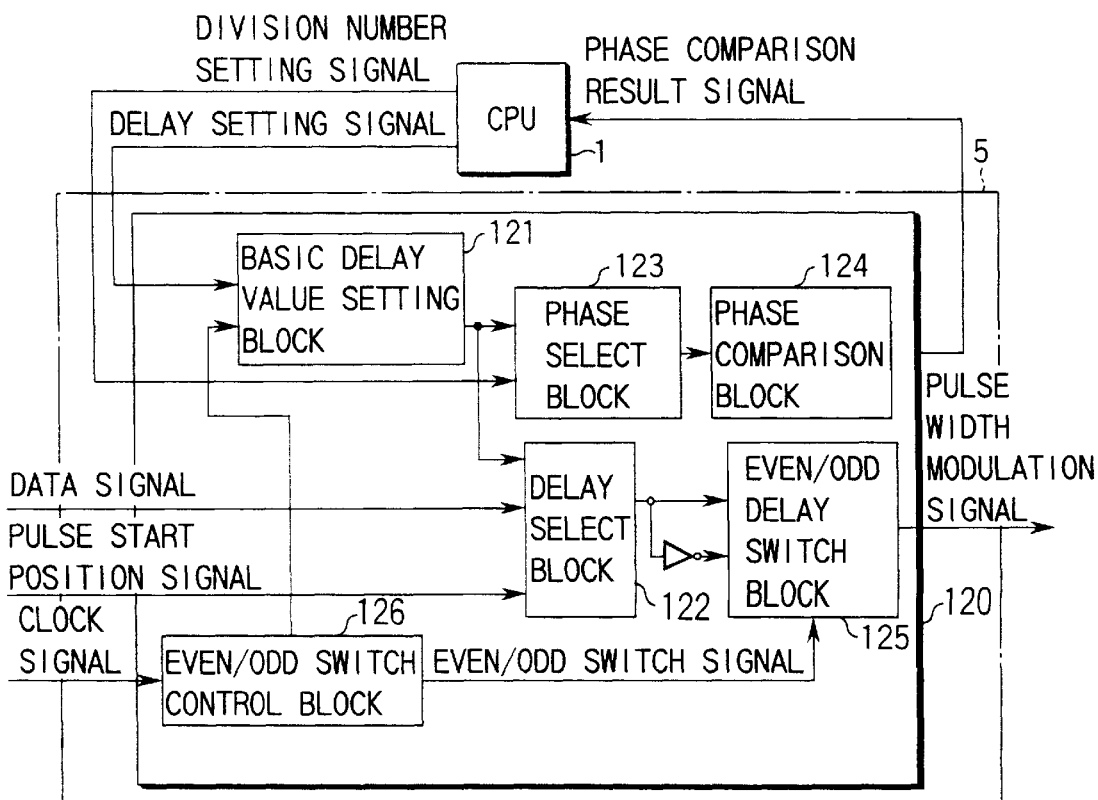
FIG. 12 is a block diagram showing a schematic structure of a pulse width modulation system according to a second embodiment.

FIG. 12 shows a schematic structure of a pulse width modulation system according to the second embodiment. In the pulse width modulation system according to the second embodiment, as compared to the first embodiment shown in FIG. 6, the function of the EVEN/ODD switch control block is reduced and one of the delay select blocks is omitted.

A pulse width modulation circuit 120 comprises six kinds of blocks. The pulse width modulation circuit 120 comprises a basic delay value setting block 121, a delay select block 122, a phase select block 123, a phase comparison block 124, an EVEN/ODD switch block 125, and an EVEN/ODD switch control block 126.

The pulse width modulation circuit 120 receives a data signal (emission time information) as a basis for pulse width modulation, a clock signal (image transfer clock), a pulse start position signal (emission start position information), and a delay setting signal and a division number setting signal from the CPU 1, and outputs a phase comparison result signal and a pulse width modulation signal on the basis of these input signals.

FIGS. 13A and 13B show a detailed structure of the pulse width modulation circuit 120 shown in FIG. 12.

The basic delay value setting block 121 shown in FIG. 13A can set a $2^m$ number of basic delays on the basis of a signal (an m-bit delay setting signal). The basic delay value setting block 121 inputs a signal A (a clock start signal (a 2-division signal of an original oscillation clock)) and delivers outputs with delays.

The display select block 122 shown in FIG. 13A receives n-bit signals with delays provided by the basic delay value setting block 121 as well as a signal F (data signal) and a signal G (a pulse start position signal). The delay select block 122 selects signals from the signals delayed by the basic delay value setting block 121 on the basis of the signal F (data signal), and outputs a signal with a non-inverted polarity and a signal with an inverted polarity to the EVEN/ODD switch block 125 as candidates of signals K/L (pulse width modulation signals).

In this case, a signal G (pulse start position signal) is also input as a condition. If this signal is "1", a pulse width modulation signal is output from the right side. If it is "0", a pulse width modulation signal is output from the left side.

The phase select block 123 shown in FIG. 13A receives n-bit signals with delays provided by the basic delay value setting block 121 as well as a signal D (an n-bit division number setting signal). The phase select block 123 outputs a signal, which is selected from the signals delayed by the basic delay value setting block 121 on the basis of the division number setting signal, as a signal B (a clock end signal).

In the phase comparison block 124 shown in FIG. 13A, a flip-flop (F/F) compares the phase of the signal B (clock end signal) output from the phase select block 123 and the phase of the non-delayed signal A (clock start signal) and outputs a signal C (phase comparison result signal).

The EVEN/ODD switch control block 126 shown in FIG. 13A receives the signal E (clock signal). Based on this clock signal, it generates the signal A (clock start signal (2-division signal of original oscillation clock)) and signal H (EVEN/ODD switch signal). This EVEN/ODD switch signal is input to the EVEN/ODD switch block 125, thereby to select and determine the output signal K/L (candidate signal for pulse width modulation signal) from the delay select block 122.

Figure 14:
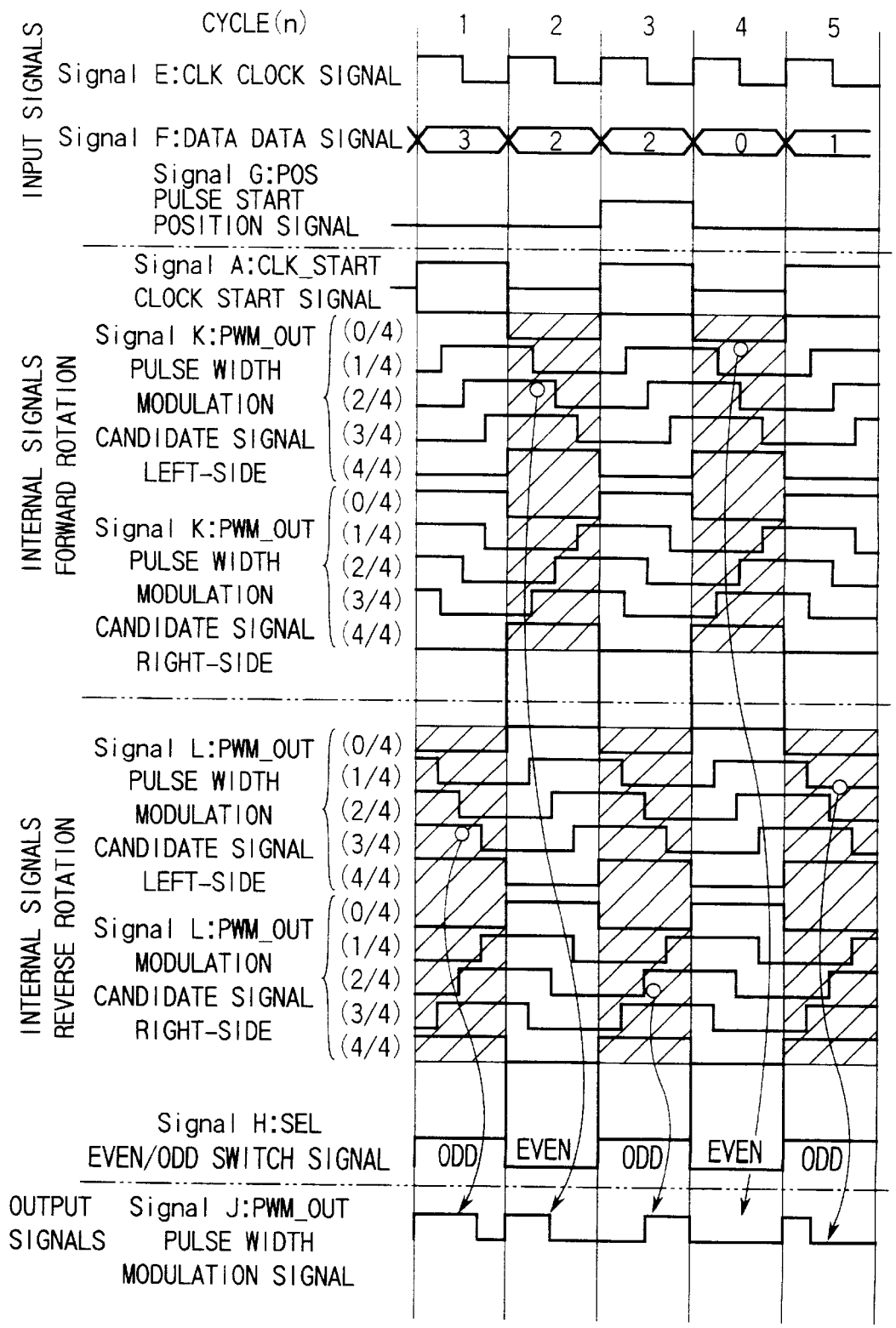
FIG. 14 is a timing chart illustrating various signals.

FIG. 14 is a timing chart of various signals. This timing chart represents the operation of the pulse width modulation circuit 120 shown in FIG. 13A by means of waveforms.

For instance, the timing chart shows waveforms of the respective signals obtained by 4-division pulse width modulation.

The pulse width modulation circuit 120 receives the signal E (clock signal), signal F (data signal) and signal G (pulse position start signal), and outputs the signal J (pulse width modulation signal). The other signals indicates internal signals in the pulse width modulation circuit 120. It should be noted, however, that the signal D, I sets a given value.

On the basis of the input clock signal, the EVEN/ODD switch control block 126 generates the signal A (clock start signal (2-division signal of clock signal)) and signal H (EVEN/ODD switch signal).

The signal K/L represents a candidate signal for the pulse width modulation signal with non-inverted or inverted polarity and the left/right pulse start position.

The finally output signal is the signal J (pulse width modulation signal). As regards this signal, when the signal H (EVEN/ODD switch signal) is at level "1", a signal indicated by the signal F (data value) is selected from the candidate signals L with inverted polarity for the pulse width modulation signal, whose pulse start position is on the left side where the signal G (pulse start position signal) is "0", or whose pulse start position is on the right side where the signal G (pulse start position signal) is "1". Thus, the pulse width modulation signal J (pulse width modulation signal) is output.

When the signal H (EVEN/ODD switch signal) is at level "0", a signal indicated by the signal F (data value) is selected from the candidate signals K with non-inverted polarity for the pulse width modulation signal, whose pulse start position is on the left side where the signal G (pulse start position signal) is "0", or whose pulse start position is on the right side where the signal G (pulse start position signal) is "1". Thus, the pulse width modulation signal J (pulse width modulation signal) is output.

A third embodiment will now be described.

Figure 15:
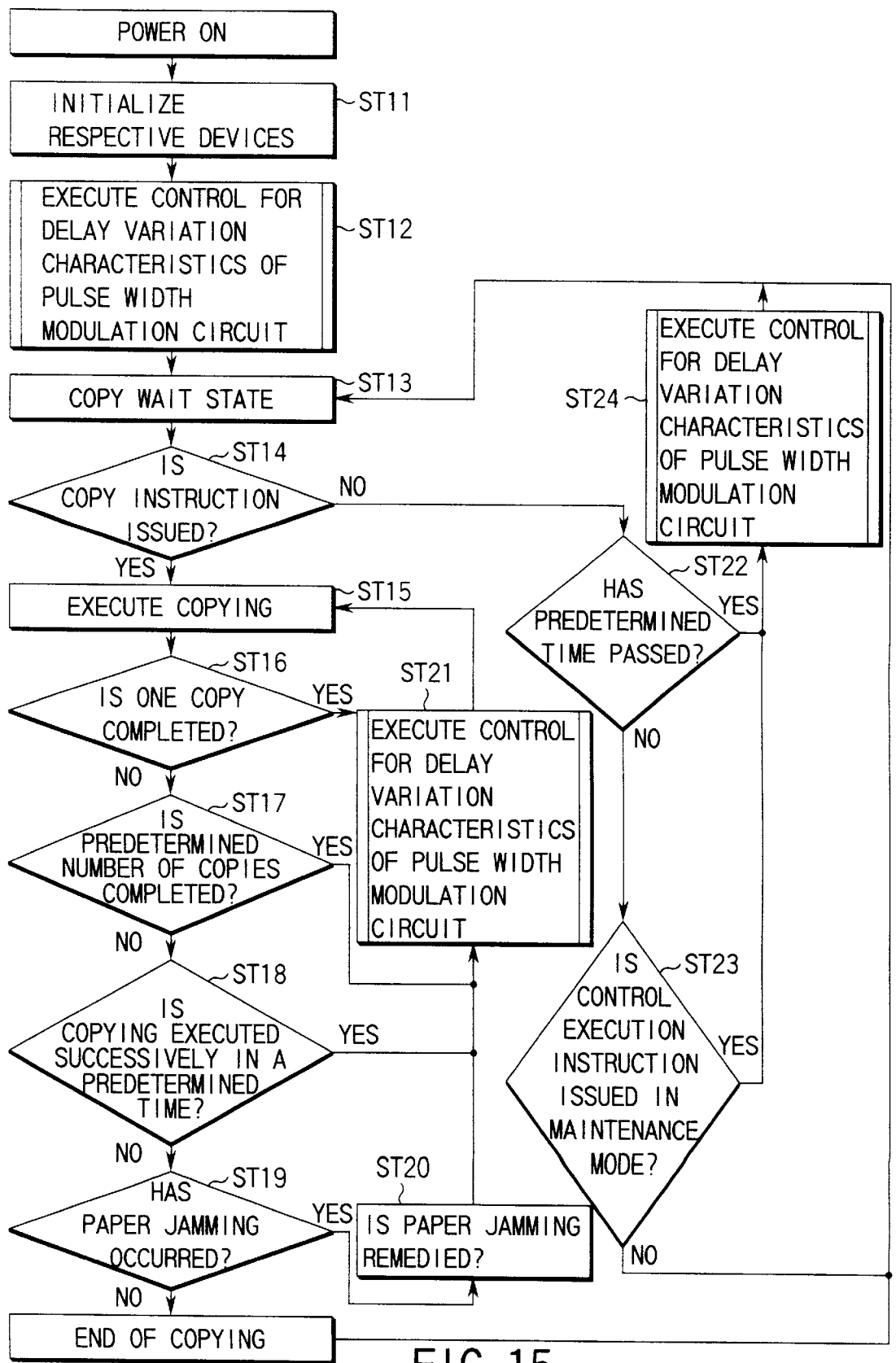
FIG. 15 is a flow chart for describing a control of delay variation characteristics in a pulse width modulation circuit according to a third embodiment.

Referring to a flow chart of FIG. 15, a description will now be given of a control execution operation for delay variation characteristics of the pulse width modulation circuit in the present digital copying machine.

Figure 1C:
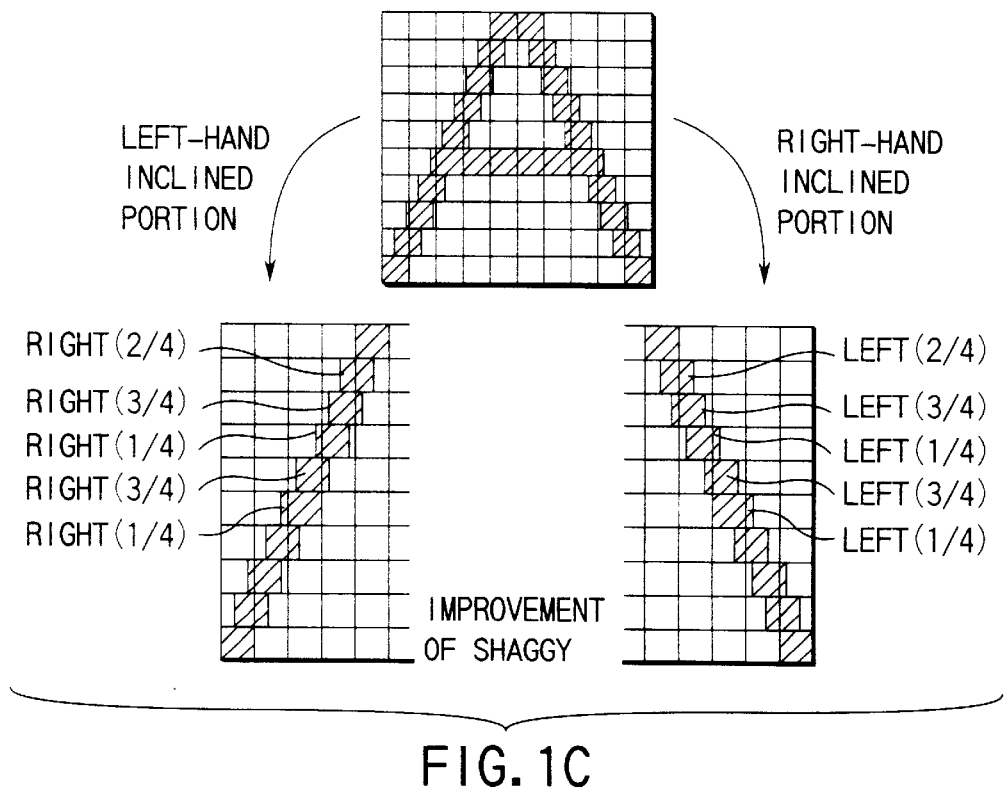
Figure 3:
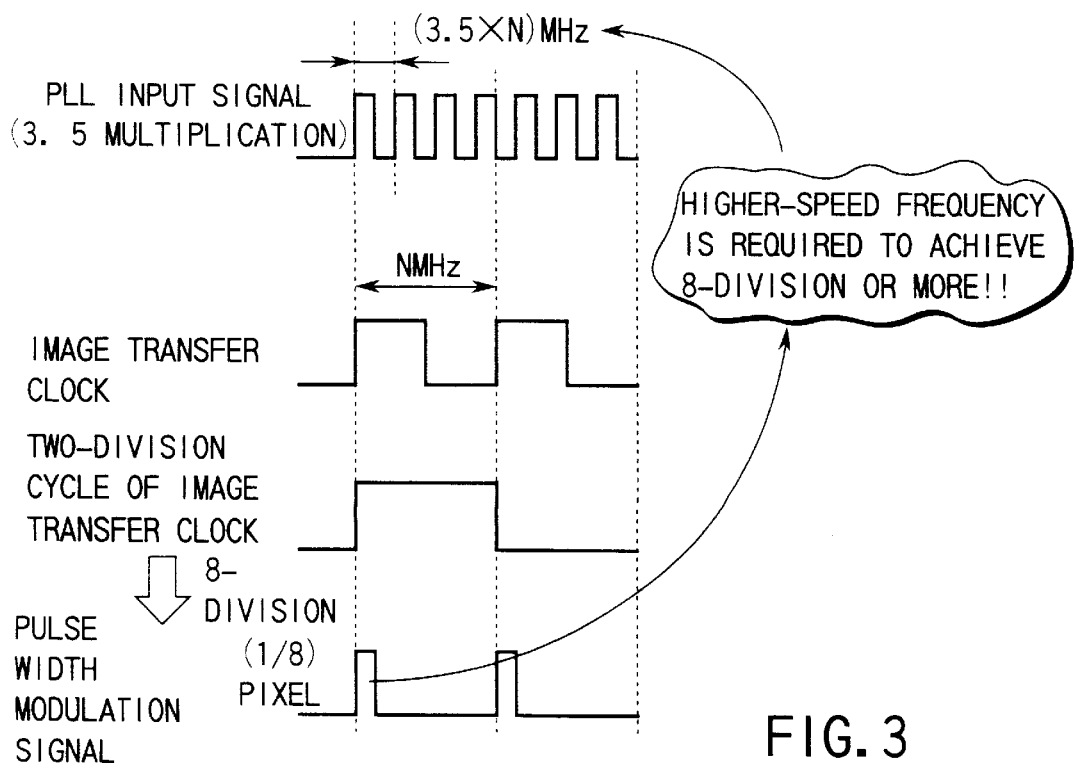
FIG. 3 shows a relationship among clocks where a PLL is used.
Figures 2A, 2B:
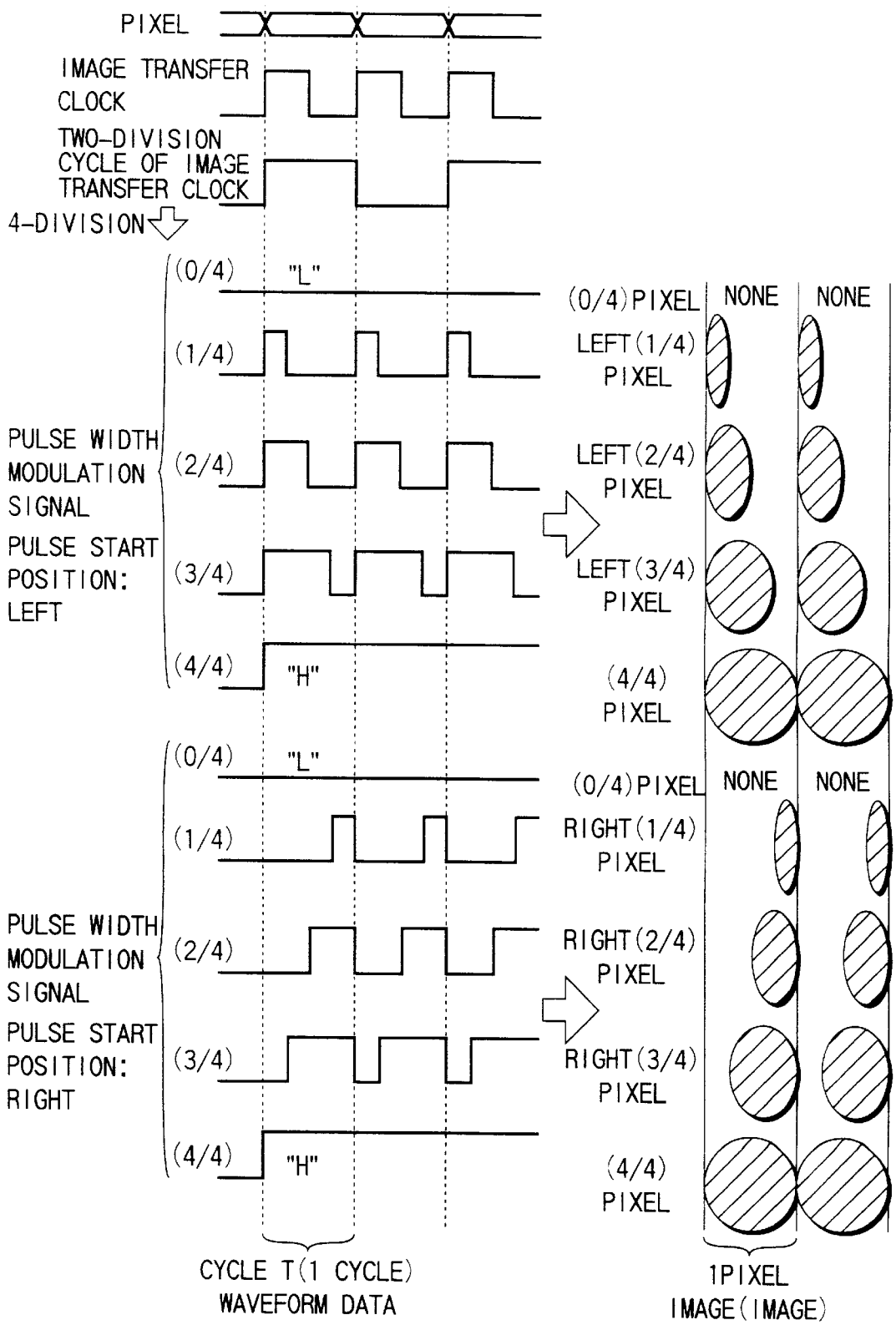
FIGS. 2A and 2B show waveform data and pixels in an associated manner.

When power is turned on, the CPU 1 initializes the respective devices (ST11) and executes a control for delay variation characteristics of the pulse width modulation circuit 100 which was described with reference to FIG. 1 (ST12).

The digital copying machine is set in the wait state (ST13).

When a copying instruction is issued (ST14), the CPU 1 executes the copying operation (ST15). When the copying operation for one sheet has been completed, the CPU 1 executes the control for delay variation characteristics of the pulse width modulation circuit 100 (ST21).

In addition, when a predetermined number of copies have been completed (ST17), the CPU 1 executes the control for delay variation characteristics of the pulse width modulation circuit 100 (ST21).

Moreover, when the copying operation is executed successively in a predetermined time period (ST18), the CPU 1 executes the control for delay variation characteristics of the pulse width modulation circuit 100 (ST21).

Besides, if a paper jam has occurred and if it has been remedied (ST19, 20), the CPU 1 executes the control for delay variation characteristics of the pulse width modulation circuit 100 (ST21).

If no copying instruction is issued in step ST14 and a predetermined time has passed (ST22), the CPU 1 executes the control for delay variation characteristics of the pulse width modulation circuit 100 (ST24).

When a control execution instruction is issued in the maintenance mode (ST23), the CPU 1 executes the control for delay variation characteristics of the pulse width modulation circuit 100 (ST24).

In the third embodiment, the pulse width modulation circuit 100 is adopted by way of example. The same control, however, is executed even where the pulse width modulation circuit 120 is used.

As regards the combination of the pulse width modulation circuit and the CPU constituting the pulse width modulation system, the CPU may be replaced with a circuit such as a microcomputer.

As has been described above, according to the embodiments of the present invention, the above-described control sequence is executed to exactly control the pulse width modulation irrespective of the delay characteristic variation in the LSI.

What is claimed is:

1. An image forming apparatus comprising:
   pulse width modulation means for outputting a necessary pulse width modulation signal in response to an input signal;
   image forming means for forming an image on an image formation medium on the basis of the pulse width modulation signal output from the pulse width modulation means;
   control means for controlling a pulse width modulation of the pulse width modulation means by detecting delay variation characteristics of the pulse width modulation means; and
   execution means for executing a control by the control means at a time of a predetermined operation.

2. An image forming apparatus according to claim 1, wherein said execution means executes a control by the control means at a time of turning-on of power.

3. An image forming apparatus according to claim 1, wherein said execution means executes a control by the control means each time an image formation process is started.

4. An image forming apparatus according to claim 1, wherein said execution means executes a control by the control means in every predetermined time period in an image formation process.

5. An image forming apparatus according to claim 1, wherein said execution means executes a control by the control means each time image formation is effected on a predetermined number of image formation media.

6. An image forming apparatus according to claim 1, wherein said execution means executes a control by the control means each time a jam has occurred.

7. An image forming apparatus according to claim 1, wherein said execution means executes a control by the control means at a given time of maintenance, etc.

8. An image forming apparatus according to claim 1, wherein said execution means executes a control by the control means at a time of turning-on of power, each time an image formation process is started, in every predetermined time period in an image formation process, each time image formation is effected on a predetermined number of image formation media, each time a jam has occurred, or at a given time of maintenance, etc.

* * * * *